(No Model.)
L. W. STOCKWELL.
DEVICE FOR SCREW THREADING AND CUTTING OFF PIPES, &c.
No. 267,276. Patented Nov. 7, 1882.
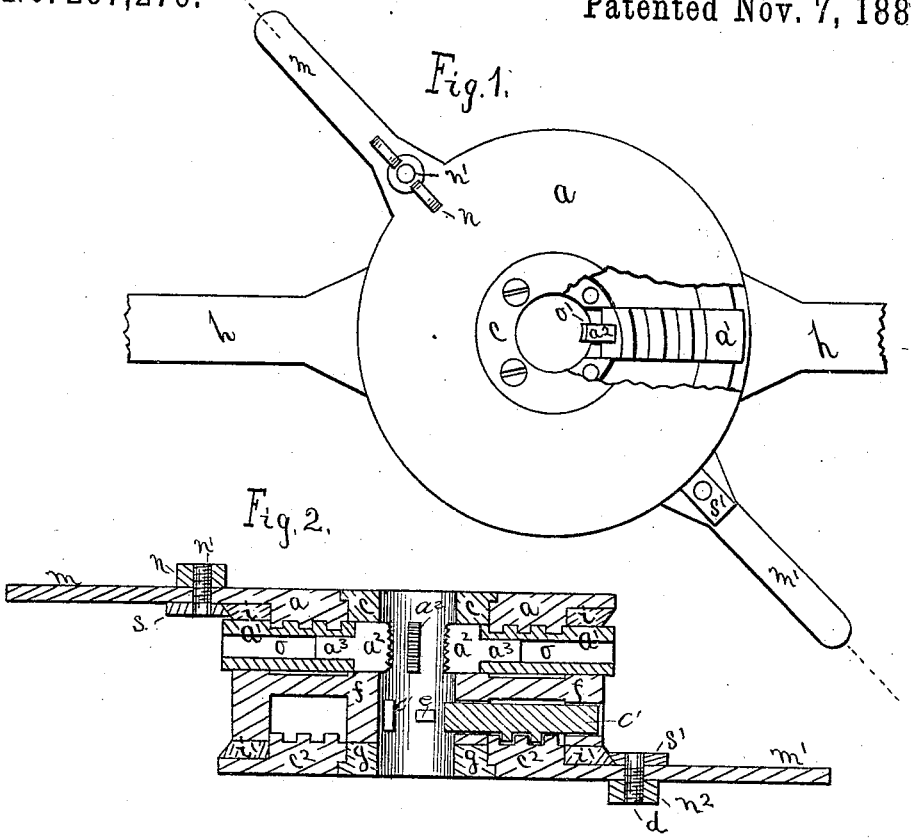
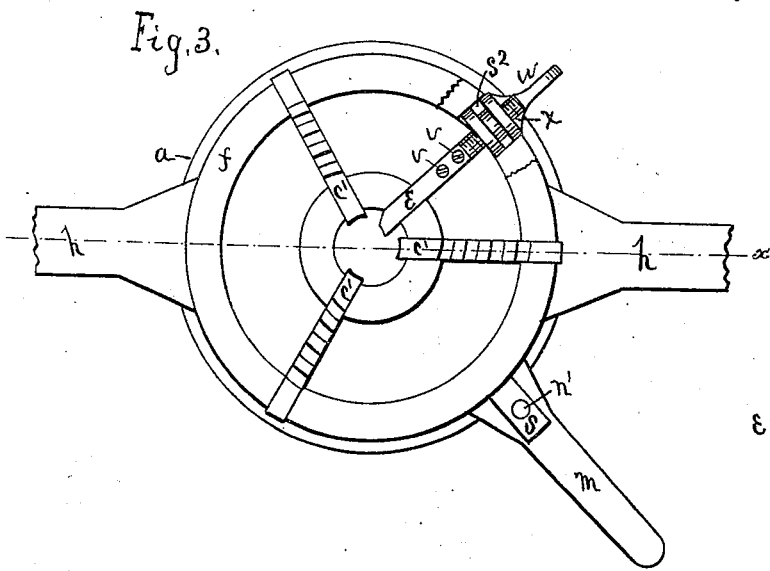
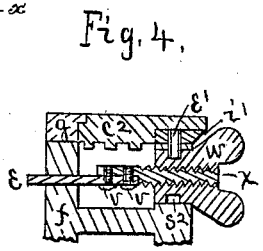
Witnesses
Jamie W. Holcomb
Geo. F. Robinson
Inventor
Levi W. Stockwell
by Bradford Howland
Atty.

United States Patent Office.

LEVI W. STOCKWELL, OF CLEVELAND, OHIO, ASSIGNOR TO WILLIAM H. PRICE, OF SAME PLACE.

DEVICE FOR SCREW-THREADING AND CUTTING OFF PIPES, &c.

SPECIFICATION forming part of Letters Patent No. 267,276, dated November 7, 1882.

Application filed July 13, 1881. (No model.)

*To all whom it may concern:*

Be it known that I, LEVI W. STOCKWELL, of Cleveland, Ohio, have invented a new and useful Improvement in Machines for Threading and Cutting Off Pipes, of which the following is a specification.

This invention relates to that class of screw-threading machines which are provided with adjustable guides to retain the pipe in a central and proper position to be threaded and cut off.

The object of my invention is, first, to adjust the die-holders by turning a scroll-plate provided with involute threads, which connect with corresponding threads across the die-holders, and to adjust the guides by a similar scroll in the same manner; second, an adjustable cutting-off tool between and separate from the guides; third, to lock the scroll-plate by a screw and friction-stop; fourth, a threading-die having a reduced shank, in combination with a die-holder having a vertical slot in its face and an opening through it lengthwise to receive the die-shank.

In the drawings, Figure 1 is a plan with a part of the face-plate and scroll-plate broken away. Fig. 2 is a vertical section at the dotted line in Fig. 1. Fig. 3 is a plan, viewed from below, with the lower face-plate and ring $i'$ removed. Fig. 4 is a vertical section representing the cutting-off tool and adjacent parts.

The frame $f$ of the machine is provided with a central opening, radial slots to receive the die-holders $a'$, and guides $c'$ and handles $h$, by which it is operated. Scroll-plate $a$ is retained in position against the end of the frame by face-plate $c$, and may be turned to adjust die-holders $a'$ by means of its handle $m$. The scroll or involute threads on the inner side of scroll-plate $a$ connect with corresponding threads across the top of die-holders $a'$ to give radial motion to the die-holders and dies $a^2$ by turning scroll-plate $a$. The ring $i$ forms a part of frame $f$. It is fastened to the outer part of the face of frame $f$ and face-plate $c$ to the inner face of the frame. Die-holder $a'$ is slotted at $o'$ vertically across its inner end, as shown in Fig. 1, to receive the full width of die $a^2$, and has a central opening, $o$, lengthwise through it to receive and hold the reduced shank $a^3$ of the die. The face of die $a^2$ extends beyond die-holder $a'$, as shown in Fig. 1.

When it is desired to remove the die $a^2$ from its holder $a'$ or to replace it the die-holders $a'$ should first be drawn back by turning scroll-plate $a$, and then the dies may be punched forward and out of their holders into the central opening of the machine. That they may be thus removable, the length of the dies should not be greater than the diameter of the central opening.

When die-holders $a'$ and dies $a^2$ have been adjusted to the proper position for threading a bolt or pipe the nut $n$ should be turned on screw $n'$ to draw stop $s$ firmly against the beveled circumference of ring $i$ to lock scroll-plate $a$. Stop $s$ is attached to the end of screw $n'$, which projects through handle $m$. When the pipe has been threaded the dies $a^2$ may be withdrawn from it by turning scroll-plate $a$ after unlocking it by turning nut $n$.

The guides $c'$ are actuated in the same manner as die-holders $a'$ and by similar devices, consisting of scroll-plate $c^2$, held in position by face-plate $g$, and provided with handle $m'$, the nut $n^2$, screw $d$, and stop $s'$. The purpose of guides $c'$ is to retain the pipe in a central position to be threaded and cut off by the cut-off tool $e$. This tool is attached by screws $v$ to the shank of screw $x$, which is cut away on one side to receive tool $e$. Tool $e$ is fed to and withdrawn from the severed pipe by turning thumb-nut $w$ in frame $f$, where it is retained by pin $e'$. This pin is loose in frame $f$ and rests in groove $s^2$. It extends to scroll-plate $c^2$, which retains it in place. Being loose in the frame, it is easily removable to allow nut $w$, screw $x$, and tool $e$ to be withdrawn from the frame and replaced whenever desired, or when the tool is to be sharpened. Cut-off tool $e$ is entirely disconnected from guides $c'$. It is situated between them and in their circle of motion, to prevent the bolt or pipe to be cut from tipping or bending when nearly severed, the guide supporting the pipe on each side of the groove cut by tool $e$.

I claim as my invention—

1. The scroll-plate $a$, in combination with nut $n$, screw $n'$, stop $s$, and ring $i$, the latter forming a part of frame $f$, and the stop $s$ being attached to the handle of plate $a$, and having a bearing only at its inner end against ring $i$, substantially as described.

2. The scroll-plate $a$, in combination with ring $i$, forming a part of frame $f$, and formed with a beveled circumference, stop $s$, formed with a corresponding bevel at its inner end, screw $n'$, and nut $n$, substantially as described.

3. The die $a^2$, formed with a reduced shank, $a^3$, in combination with die-holder $a'$, formed with a vertical slot, $o'$, and an opening, $o$, to receive and hold the shank of the die, the opening $o$ extending through the outer end of the die-holder, and the die, with its shank, not exceeding in length the diameter of the central opening of the stock or frame $f$, for the purpose of facilitating the removal and replacing of the dies, substantially as described.

4. The cutting-off tool $e$, in combination with screw $x$, nut $w$, formed with a circumferential groove, $s^2$, pin $e'$, frame $f$, and scroll-plate $c^2$, the pin $e'$ being removable from frame $f$ and retained therein by the scroll-plate, substantially as described.

LEVI W. STOCKWELL.

Witnesses:
H. S. SHERMAN,
WILBUR PARKER.